United States Patent
Ahlberg et al.

[11] Patent Number: 6,014,661
[45] Date of Patent: Jan. 11, 2000

[54] SYSTEM AND METHOD FOR AUTOMATIC ANALYSIS OF DATA BASES AND FOR USER-CONTROLLED DYNAMIC QUERYING

[75] Inventors: Christopher Ahlberg, Göteborg; Staffan Truvé, Alingsås; Erik Wistrand, Göteborg, all of Sweden

[73] Assignee: Ivee Development AB, Göteborg, Sweden

[21] Appl. No.: 08/850,828

[22] Filed: May 2, 1997

Related U.S. Application Data

[60] Provisional application No. 60/019,049, May 6, 1996.

[51] Int. Cl.⁷ .................................................. G06F 17/30
[52] U.S. Cl. ................................. 707/3; 705/10; 706/61
[58] Field of Search .......................... 707/3–5, 1; 395/12, 395/705; 705/7, 10, 36; 706/61; 345/326

[56] References Cited

U.S. PATENT DOCUMENTS

| | | |
|---|---|---|
| 3,296,597 | 1/1967 | Scantlin et al. . |
| 4,752,889 | 6/1988 | Rappaport et al. ........................ 706/11 |
| 4,823,306 | 4/1989 | Barbic et al. ............................. 364/900 |
| 5,224,206 | 6/1993 | Simoudis .................................... 395/77 |
| 5,335,345 | 8/1994 | Frieder et al. ........................... 395/600 |
| 5,454,104 | 9/1995 | Steidlmayer et al. ....................... 707/4 |
| 5,499,368 | 3/1996 | Tate et al. ................................... 707/4 |
| 5,535,382 | 7/1996 | Ogawa ..................................... 395/600 |
| 5,594,897 | 1/1997 | Goffman ................................. 395/613 |
| 5,608,899 | 3/1997 | Li et al. ................................... 395/604 |
| 5,640,553 | 6/1997 | Schultz ................................... 395/605 |
| 5,734,888 | 3/1998 | Li et al. ................................... 395/604 |
| 5,768,578 | 6/1998 | Kirk et al. ............................... 395/611 |
| 5,794,209 | 8/1998 | Agrawal et al. ........................... 705/10 |
| 5,799,311 | 8/1998 | Agrawal et al. ......................... 707/102 |
| 5,841,437 | 11/1998 | Fishkin et al. ........................... 345/346 |
| 5,918,217 | 6/1999 | Maggioncalda et al. ................. 705/36 |

*Primary Examiner*—Thomas G. Black
*Assistant Examiner*—Uyen Le
*Attorney, Agent, or Firm*—Jeffrey Slusher

[57] ABSTRACT

A main processing system accesses a data base, which contains data records, each of which is divided into data fields. The system preferably automatically determine the type of data in each field, as well as its range of values. It then preferably determines one or more relational structures of the field data using a corresponding number of relevance measures. For each field, a preferably user-adjustable, software-generated query device is displayed, preferably in the order of the relevance measures of the respective fields. The plot of one or more fields' data relative to that of another field is initially generated using the fields in order of relevance. The relevance measure forming the basis of the field ordering, the order of fields, and the ranges of the plotted, displayed fields may be adjusted interactively by the user by moving and adjusting the various query devices.

9 Claims, 5 Drawing Sheets

SYSTEM AND METHOD FOR AUTOMATIC ANALYSIS OF DATA BASES AND FOR USER-CONTROLLED DYNAMIC QUERYING

CROSS-REFERENCE TO RELATED APPLICATIONS

This application claims priority of U.S. Provisional Patent Application No. 60/019,049, filed May 6, 1996.

BACKGROUND OF THE INVENTION

1. Field of the Invention

This invention relates to a method and system for retrieving data, for example from a data base, and for allowing a user to selectively view the data based on interactive queries.

2. Description of the Related Art

At present, when a user wishes to analyze the data in a data base, he faces the tedious task of entering a series of search parameters via a screen of input parameters. At times, the various queries must be linked using Boolean operators, and changing one parameter or operator may often necessitate changing many other less crucial parameters so as to keep them within the logical range of the input data set. Similar difficulties are now also arising when a user or a search engine scans many Internet sites to match certain criteria.

Furthermore, the concept of "analyzing" the data in a data base usually entails determining and examining the strength of relationships between one or more independent data characteristics and the remaining characteristics. This, in turn, leads to an additional difficulty—one must decide what is meant by the "strength" of a relationship how to go about measuring this strength. Often, however, the user does not or cannot know in advance what the best measure is.

One common measure of relational strength is statistical correlation as determined using linear regression techniques. This relieves the user of the responsibility for deciding on a measure, but it also restricts the usefulness of the analysis to data that happens to fit the assumptions inherent in the linear regression technique itself. The relational information provided by linear regression is, for example, often worse than useless for a bi-modal distribution (for example, with many data points at the "high" and "low" ends of a scale, but with few in the "middle") since any relationship indicated will not be valid and may mislead the user.

What is needed is a system that can take an input data set, select suitable (but user-changeable), software-generated query devices, and display the data in a way that allows the user to easily see and interactively explore potential relationships within the data set. The query system should also be dynamic such that it allows a user to select a parameter or data characteristic of interest and then automatically determines the relationship of the selected parameter with the remaining parameters. Moreover, the system should automatically adjusts the display so that the data is presented logically consistently. This invention makes this possible.

SUMMARY OF THE INVENTION

The invention provides a system and method for processing and visualizing data from a data base, in which the data base contains a plurality of records, each record includes a plurality of data fields, and each field has field data, a field name, and one of a plurality of data types. First, the main processing system according to the invention accesses the data base and reads in the records. For large data bases, in order to reduce processing time, the system may alternatively sample the records before proceeding with general evaluation.

In a preferred embodiment of the invention, one or more relevance measures are then selected and the system automatically detects a relational structure between the fields by calculating the relevance measure for each of the fields. Selected ones of the fields are then displayed in an order determined as a predetermined function of their respective relevance measures. The user may choose a different relevance measure from among the selected ones as the basis for the display. The system then selects a display format (for example, X–Y plot, pie chart, etc.) and displays at least one of the fields' data for the user. In the preferred embodiment, the relationship between at least two of the fields is displayed, with one field forming a base or primary field and the other field(s) forming secondary field(s). The user may also change the display format, scaling, and selection of displayed fields.

In a preferred embodiment of the invention, the system automatically detects the data type of each field, as well as a data range for each field, by evaluating the corresponding field data over a plurality of the data records. For each field, the system then automatically selects one of a predetermined set of display query devices as a predetermined function of the corresponding data type and data range. The system then displays to the user the corresponding display query devices for each field, with displayed range markings corresponding to the data range of the field. The displayed query device is preferably user-adjustable over the displayed range markings, with the display being adjusted according to the current range settings of each field's query device.

DETAILED DESCRIPTION

The invention is well suited for interactive visualization and analysis of data from any type of data base. Just a few of the thousands of possible uses of the invention are the visualization and analysis of financial data, marketing data, demographic data, experimental data, environmental data, logistics data, World-Wide Web log files, manufacturing data, biostatistics, geographic data, and telephone traffic/usage data.

Figure 1:
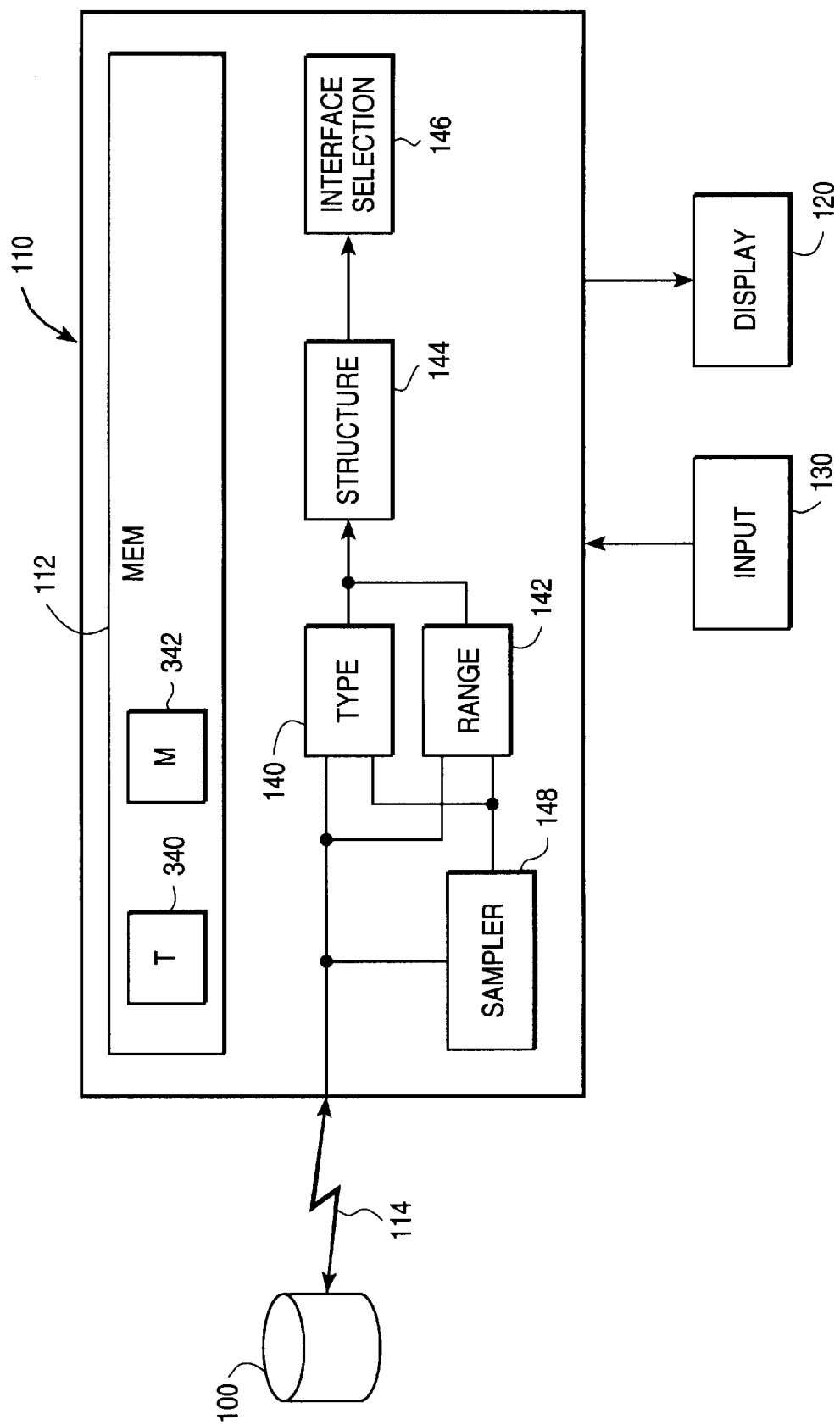
FIG. 1 illustrates the main components of a system according to the invention for retrieving and displaying data from a data base.

The main components of the system according to the invention are illustrated in FIG. 1. A data base or data set 100 may be stored in any conventional devices such as magnetic or optical disks or tapes and semi-conductor memory devices. The size of the data set may be arbitrary, as the invention has no inherent limitations in the size of the data base it can process.

A main processing system 110 may be implemented using a microprocessor, a mini- or mainframe computer, or even a plurality of such processors operating in parallel or as a pipeline. The processing configuration may be chosen using normal design techniques based on the size of the largest data set one expects to have to process, and on the required processing times. The processing system 110 includes, among other sub-systems, a sufficiently large memory 112 to store all data used in the data classification and display procedures described below.

The data set 100 (that is, its storage device) is connected for communication with the main processing system by means of any conventional channel 114, which may be a dedicated channel, or a general-purpose channel such as telephone lines (for example, for connection through a network, including the Internet), fiber-optic or high-bandwidth metal cables, or radio or micro-wave links. The size of the data set and the desired processing speed will in general determine which channel is appropriate and fast enough. The data set need not be remote from the processing system; rather, the data set's storage device 100 may even be a peripheral memory device connected directly to the processing system 110.

In most applications of the invention, the user will wish to see a graphical display of some feature of the data set. This is not, however, necessary—the invention may be used as a sub-system that queries the data base 100 and organizes the data for a supervisory routine, which then processes the data automatically in some other way. For example, the invention may be used in a system that automatically generates lists of potential customers of a product chosen from a large data base of consumer information. In the typical case, however, the results of the data processing using the invention are to be interactively displayed and to that end, a display unit 120 is preferably connected to the main processing system 110. The display unit may be a standard device such as a computer monitor or other CRT, LCD, plasma or other display screen. Standard display drivers (not shown) are included in the display unit 120 and are connected to the processing system 110 in any conventional manner.

A conventional input system 130 is also connected to the main processing system in the normal case in which the user is to select initial data classification parameters. The input system may consist of a single standard positional input device such as a mouse or a trackball, or an alphanumeric input device such as a keyboard, but will normally include both types of devices. The display unit 120 itself may also form part of the input device 130 by providing it with standard touch-screen technology. The connection and interface circuitry between the input system 130 and display unit 120 on the one hand and the processing system 110 on the other hand may be implemented using standard components and is therefore not described further here.

The main procedural steps carried out by the invention are as follows:

1) The main processing system 110 accesses the data base 100 in any known manner and exchanges standard protocol information. This information will normally include data indicating the size of the stored data set as well as its record and field structure.

2) The processing system then downloads records and classifies them by type (also known as attribute). Some examples of the many different possible types of data include integers, floating-point numbers, alphanumeric characters, and special characters or codes, lists and strings, Boolean codes, times and dates, and so on. In a data base of films, for example, each record may have data concerning the title and the director's name (alphanumeric attribute), the release year (an integer), whether the film is a comedy, drama, documentary, action film, science fiction, etc. (marked in the data base as an integer or alphanumeric code), whether the film won an Academy Award (logical) or how many it won (integer). As is described in greater detail below, the system according to the invention preferably automatically type-classifies the various fields in the data base records. In certain cases, however, the data base itself (in the initial protocol and structural information) may also indicate the types of the various fields of the records; in such case, the processing system may not need to type-classify the fields and can omit this step.

3) For each record set that the processor has classified, it then (or simultaneously) determines the range of the data for each field in the set. This can be done in any of several standard ways, and different methods may be used for different data types. For numerical data sets, the system may simply search through the set to determine the maximum and minimum values as well as (if needed), the average or median values to aid in later centering and scaling of a corresponding displayed query device. The system preferably also counts the number of different values in each set of fields in all of the records in the data set. Ranges may also be predetermined; for example, if the user wishes to include in the data base search data records sorted alphabetically by surnames of Americans or Britons, then the range of first letters will be no greater than A–Z (a range count of 26), although a search of the actual records in the data base might show that the range of, say, A–W is sufficient (with a range count of 23). For names (or other text) in other languages, the alphabetical range and range count may be either greater or smaller; for example, Swedish text could begin on any of 29 different letters (A–Z, Å,Ä,Ö).

4) The system then analyzes the relational structure of the data records using any or all of a plurality of methods. These methods include regression, decision trees, neural networks, fuzzy logic, and so on. According to the invention, the system preferably applies more than one method to determine the structure of the data and then either selects the "best" method in some predetermined sense, or else it presents the results of the different structural determinations to the user, who then may then select one that appears to give the best result.

5) Once the system has determined the data field types and ranges, the system determines a user interface to be displayed on the display unit 120. The results of the structural relational analysis are also preferably used to order the various query devices that are displayed to the user to give him guidance in finding the strongest relationships among the various fields of the data base. The interface preferably automatically selects (at least initially—later, the system automatically presents alternatives to the user, from which he may select) the lay-out of query devices (described below), coordinate axes (either automatically or under user control) and scales, display colors and shapes, the degree of "zoom" of the display (if needed), or other features depending on the particular application and user preferences.

6) In many cases, there will be so many records in the data base that it would take too long for the system to search through all records in the data base to determine the record type or range. The invention therefore preferably includes the procedural step of sampling the data set to determine the record type and to extrapolate its range from the range of the sample. Different sampling techniques may be used. For example, every n'th record can be examined (where n is determined by what percentage of the records the system can examine in a given time); or a predetermined percentage of the records can be selected randomly; or records may be sampled randomly until a predetermined statistical significance has been achieved, etc. Once the sampling process has been completed, the entire data set can be downloaded and processed for display using the type and range classifications of the sample.

As FIG. 1 illustrates, the steps of type detection, range determination, structure identification, interface selection and sampling may be carried out in dedicated processing sub-systems 140, 142, 144, 146 and 148, respectively. Note that many of the processing steps described above (for example, type/range determination and interface selection) can be carried out in parallel as well as in series. Assuming the chosen processing configuration is fast enough, however, all of these steps, or any combination of steps, may be carried out by the same processor.

In most conventional systems, data base searches are interactive only in the sense that the user's initial "guess" (search profile) can be modified and re-submitted—the user is given little or no guidance or indication of the size and range of the data involved in the various possible choices for the search profile. As such, the user might, for example, initially submit a search profile with no possible "matches." By initially analyzing the data set to determine data types (attributes) and ranges, the invention is able to create an initial query environment that allows the user to avoid such wastes of time. Even further time-saving procedures unique to the invention are described below.

Figure 2:
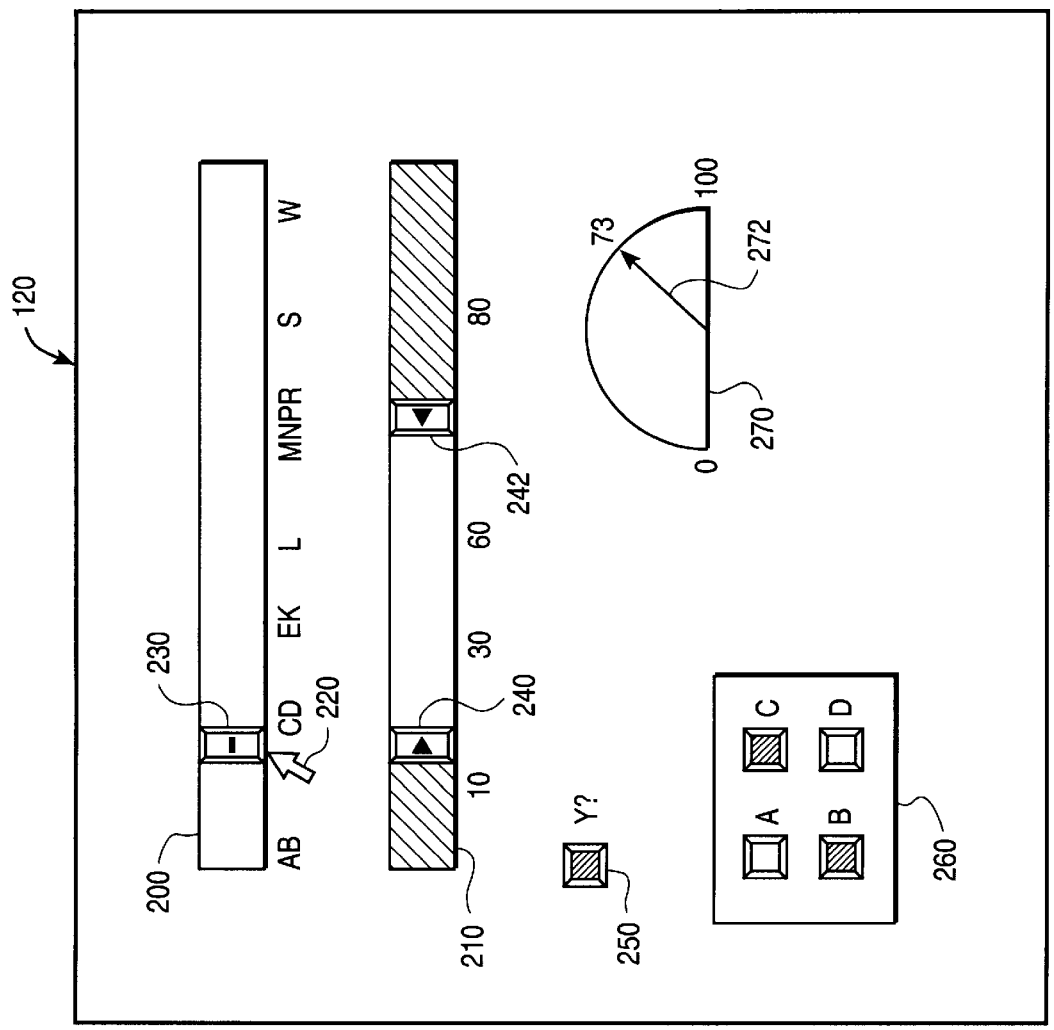
FIG. 2 illustrates examples of device queries that can be used in the invention's interactive display.

FIG. 2 illustrates examples of dynamic query devices that the processing system may generate on the screen of the display unit 120, depending on the type and range of the data. The various data query devices are generated and located for display using any known software, such as is readily available for writing display software for Microsoft Windows applications or similar software packages. One of the most useful query devices is the slider, which may be either a single-slider query device 200 for indicating single alphabetical or numerical characters, or the rangeslider query device 210 for indicating ranges of alphabetical or numerical characters; two-dimensional single and range sliders may also be used.

In FIG. 2, the attribute of the data field associated with the single slider 230 is alphabetical. One sees in this example that the data in the indicated field has relatively very few "A" entries, relatively many "B" entries, few or possibly no "j" entries, many "S" entries, and so on. The user can also see that there are no "X", "Y", or "Z" entries—the upper alphabetical limit "W" will have been determined during the range detection step. In the illustrated example, the user has manipulated a standard screen cursor 220 (for example, using a trackball or mouse included in the input system 130) to move the slider 230 approximately to the right-most range of the "B" entries. In other words, the user is requesting the system to find data records for which the corresponding data set records start with a "B".

The "scale" of the alphaslider need not be alphabetical; rather, instead of the letters "A", "B", . . . , "W" and so on, the system could display numbers, one of which the user is to select by "touching" and moving the slider 230. The user may move the slider 230, for example, by placing the tip of the cursor 220 on it and holding down a standard mouse button while moving the mouse to the left or right, releasing the button when the slider is at the desired value.

The illustrated range slider query device 210 has a scale the same as the single-valued slider, but, as its name indicates, is used to select a range of values. To do so, the user "touches" either the left range slider 240 or the right range slider 242 and moves it as with the slider 230. In the illustrated example, the user has selected a query such that only those relations should be displayed for which the chosen attribute has a value between about 13 and about 72. Excluded values are here displayed "shaded" on the slider query device.

Many variations of the illustrated sliders may be used in the invention, such as those that indicate which values are not to be included (for example, by "clicking" on an appropriate portion of the slider display to indicate by shading that the logical complement of that portion of the range is to be applied), that indicate ranges inclusive at one extreme but exclusive at the other (for example, by clicking on the range marker to toggle it to different logical states), and so on. A more complete discussion of the possibilities is given in the inventors' papers "Exploring Terra Incognita in the Design Space of Query Devices," C. Ahlberg & S Truvé, Dept. of Computer Science and SSKKII, Chalmers University of Technology, Göteborg, Sweden, which is attached as appendix A; the article "The Alphaslider: A Compact and Rapid Selector," C. Ahlberg & B. Schneiderman, Proceedings, ACM SIGCHI '94, Apr. 24–8, 1994, which is attached as appendix B; and "Dynamic Queries for Information Exploration: An Implementation and Evaluation," ACM SIGCHI '92, May 3–7, 1992, which is attached as appendix C.

The illustrated example also shows a toggle 250 on which the user has "clicked" (for example, in the standard way, by "touching" the toggle with the cursor on the display screen and pressing a mouse button) to indicate that the feature "Y" should be present in the displayed data. That the toggle is "on" may, for example, be indicated by the processing system by displaying it darker, by superimposing a cross ("X") on it, or in some other conventional way.

A checkbox 260 contains more than one toggle. In the illustrated example, features B and C have been selected for inclusion as a data query, whereas A and B have not. A displayed dial 270 is yet another example of a query device. Using the cursor, the user pulls the pointer 272 clockwise or counter-clockwise and the system displays the value (in the example, "73") to which the pointer is currently pointing. Other query devices may be used, for example, pull-down menus and two-dimensional sliders (for example, one on an x-axis and another on a y-axis).

Figure 3:
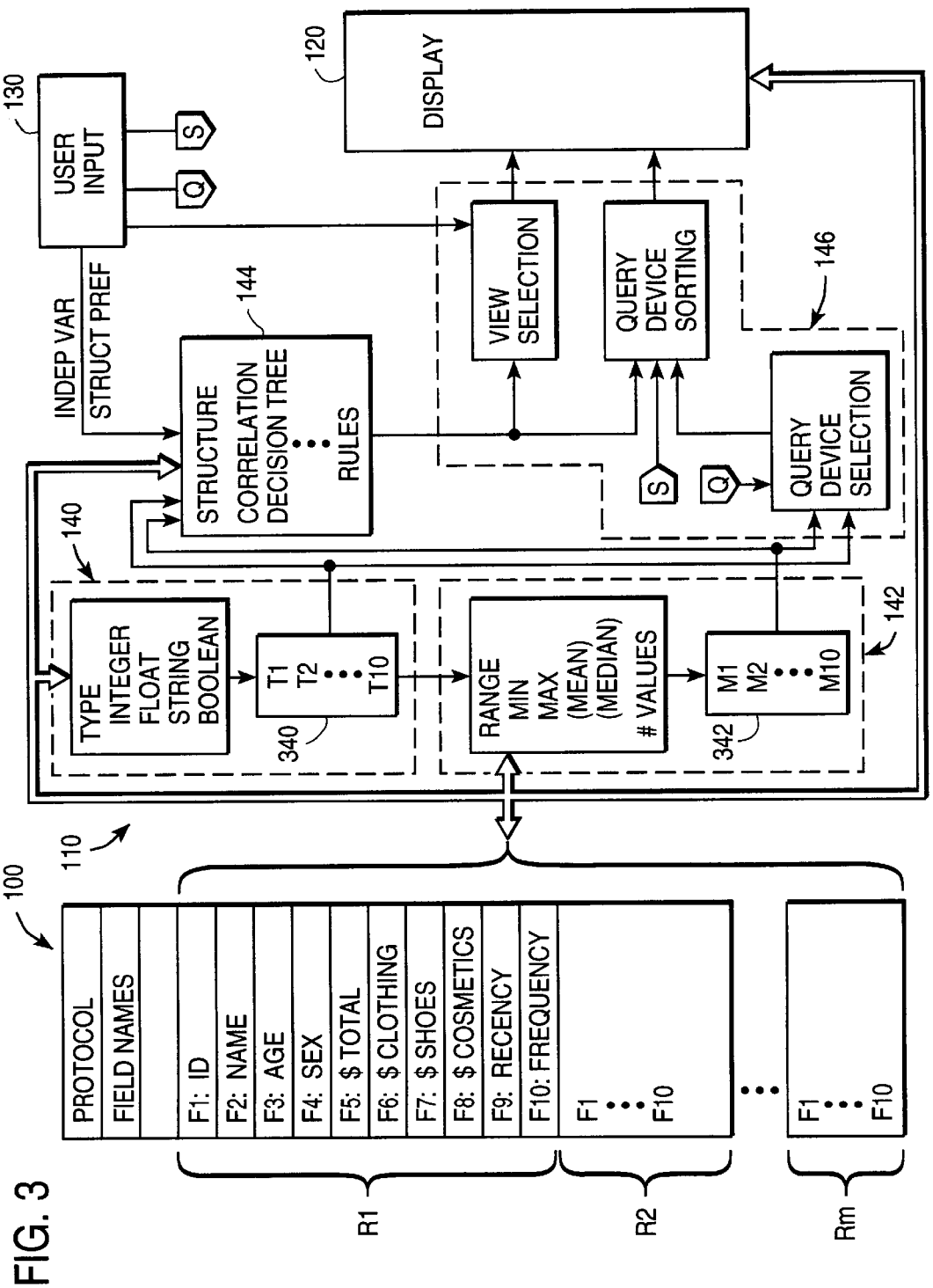
FIG. 3 illustrates the main processing steps the invention follows for one example of the use of the invention to visualize relationships between data in a data base.

FIG. 3 is a block diagram that shows not only the main paths of data flow in the invention, but also is a more detailed functional block diagram of the system shown in FIG. 1. Reference numbers for the functional blocks are the same as those in FIG. 1. Furthermore, the sampling sub-system 148 has been omitted from FIG. 3 since its operation is described above and since it will simply reduce the number of data records initially passed on to the type detection, range detection and possibly the structure detection sub-systems described below.

As is mentioned above, the invention can be used for many different types of data bases and data base structures. Merely by way of example, however, assume that the user wishes to analyze the possible relationships found between various items in a data base of customer purchases for a chain of stores that sell clothing, shoes, and cosmetics. Such data might be compiled automatically, for example, for all customers who use the store's own credit card. This situation is illustrated in FIG. 3.

As is common, the data base 100 is organized as a series of records R1, R2, ..., Rm, each of which has a number of fields F1, F2, ..., Fn. In this example, there are ten fields per record (here, n=10 but the number of fields per record in actual data bases may of course be greater or less than ten—the invention is not dependent on any particular number of records or fields). The fields (F1, F2, ..., F10) in the example are: F1) an identification code for the customer associated with the record; F2), F3) and F4) the customer's name, age and sex, respectively; F5) the total amount the customer has spent (during some predetermined period); F6), F7), and F8) the amount the customer has spent on clothing, shoes and food, respectively, during this period; F9) the date of the customer's most recent purchase; and F10) a number representing how frequently the customer makes purchases (for example, measured in transactions per month).

The illustrated data base also includes standard protocol data as well as field names associated with the different fields. The protocol data will typically include data indicating the total number of bytes (or words) the data base contains, how many records, how many fields per record, and how many bytes (or words) each field consists of. If the protocol is already standardized or otherwise predetermined between the data base 100 and the main processing system, then there will be no need for the protocol fields. Moreover, the field name data will not be necessary if it is already established in some other conventional manner for the user or the main processing system of the invention what data the various record fields represent.

In the preferred embodiment of the invention, the main processing system 110 automatically detects the type of data in each of the record fields, unless the data types are already specified by the data base in the protocol or field names data. This may be accomplished using any known data type detection routine, as long as the number of records in the data base is large enough to allow the detection routine to make statistically relevant deductions about the data. For example, in order to detect the type of data in field Fk (k=1, 2, ..., m), the processing system may access (that is, download in bulk, read in and process sequentially, etc.) all of the field data (R1, Fk), (R2, Fk), ..., (Rm, Fk), where (Rj, Fk) indicates the k'th field of the j'th record. Any of many different known tests may then be applied to determine the data type.

For example, if all (or more than a pre-defined percentage) of the bytes of all of the fields Fi (that is, field Fi in all of the records) correspond to binary numbers from 97–122 and 65–90, then the system may assume the field contains data with an alphabetical (string) attribute (type), since these are the ranges of the ASCII codes for the English-language alphabet (upper and lower case, respectively). In the example shown in FIG. 3, this would be the case for F2: Name. If only two different values are detected (especially, 00000000 and 00000001), then the system may, for example, assume that the corresponding field contains Boolean data or; if the two values also fall within the ASCII alphabetical range, then the system may instead (or, temporarily, in addition) mark the field as an alphabetical field. Field F4 might thus be either Boolean (if the Field name is "Woman?" then F4 might indicate either "yes" or "no" with binary numbers 1 and 0) or a single-element string alphabetical ("F" for female, "M" for male). Using known methods, the system will similarly distinguish between integers and floating-point numbers, often by a knowledge of the field structure itself from the protocol data—integers are typically represented by single data words, whereas floating point numbers will typically require two separate data words for the whole-number and decimal portions. Indications of the data types are then preferably stored in the memory 112 as a data type table 340 in the memory 112. In FIG. 3, field Fk has been identified as having data type Tk, (k=1, 2, ..., n).

For each field, the range detection sub-system 142 determines upper and lower limits. For numerical fields, for example, this will typically be the maximum and minimum values. For string data, however, this will typically be the letters closest to either end of the alphabet. The number of different values is preferably also accumulated for each field. Additional data may also be tabulated as desired or needed. For string data, for example, for each string field, the system might accumulate a separate table of the number of times each letter of the alphabet occurs first in the field in order to reduce clutter in the later display by eliminating non-occurring letters. The median of the occurrence table may then be calculated and used for later centering of the scale of the associated query device (see below). For numerical fields, the range detector 142 may additionally calculate such statistical range data as the mean, median, and standard deviation of the field data. All calculated range data is then preferably stored in a data range table 342 in the memory 112. In FIG. 3, field Fk has been identified as having range data Mk, (k=1, 2, ..., n).

As is mentioned above, the type- and range-detection sub-systems 140, 142 may operate either in series or in parallel. Even with a single processor implementing both sub-systems, these two sub-systems may operate "simultaneously" in the sense that each operates on a single data value before the next is processed, in order to reduce processing time by having only a single download of the data. For example, the range detector 142 may use each accessed data word as soon as the type detector is finished with it and then use it in the on-going, cumulative calculations of minima, maxima, means, and all other range data for the corresponding field. Once the type detector determines the data type for each field, the range detector can then discard range data calculations that are inappropriate to the detected type. For example, in general there will be no need for a calculation of the median or mean of Boolean or entire strings of data (although, as is mentioned above, there may be for first letters).

Once the type and range of the fields have been determined, the system then automatically determines various relationships between the different data fields. Preferably, several different methods are used, from which the system initially selects a "best" method in a predetermined sense, and also orders query devices in such a way on the display that they indicate to the user which relationships are the strongest. In some applications, the user knows which data characteristic (data field) the relationship determination is to be based on. For example, the user might wonder which type of purchase (clothing, shoes, or cosmetics) seems to be most highly dependent on the age of the customers. In such cases, the user will indicate this to the processing system by entering the independent variable—in the assumed example, "age"—via the input system 130. (The processing system may, for example, display a list of the field names on the display, from which the user can select in any standard way.) The preferred embodiment of the invention is not restricted, however, to beforehand knowledge of which data field is to be the independent variable in order to determine the structure of the data set, although this will in general reduce processing time and memory requirements.

One method of determining the structure of the data set is statistical correlation, either directly, using standard formulas, or in conjunction with determining the regression (especially linear) parameters for any two selected fields of data. For each possible pair of different data fields, the system calculates the statistical correlation and stores the resulting correlation values in a correlation matrix in the memory. The system then identifies the maximum correlation value for each field taken in turn as the independent variable, and orders the remaining variables in order of decreasing correlation. Note that statistical correlation will in general be a meaningful measure only of the relationship between sets of quantitatively ordered data such as numerical field data.

Moreover, if the user indicates which of the m variables (that is, which of the m fields) is to be used as the independent variable before the system begins correlation calculations, then the system need only calculate and order the resulting (m−1) correlation values. If the user does not indicate the independent variable for this or any other structure-determining method, then the system may simply assume each variable to be independent in turn and then calculate correlations with all others; the greatest correlation found can then be presented initially to the user.

Figure 4:
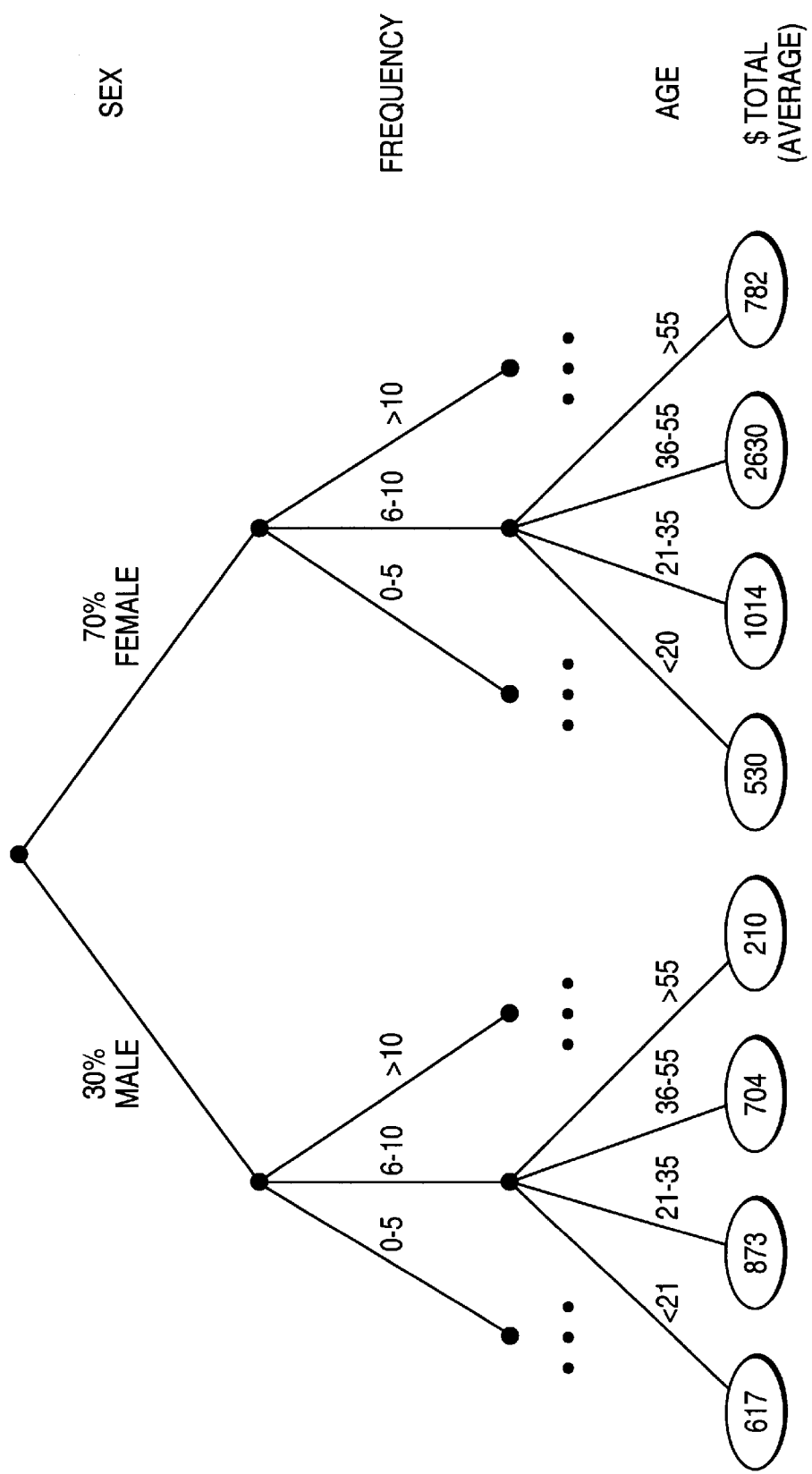
FIG. 4 illustrates a decision tree, which is one method that can be used in the invention to determine and define the structural relationship between different data fields in a data base.

Another method for determining structure is the decision tree, which can be constructed using known methods. See, for example, *Data warehousing: strategies, technologies and techniques,* Ron Mattison, McGraw Hill, 1996. As an example, consider FIG. 4, and assume that the independent variable of interest to the user is F5, that is, total spending. In the illustrated example, the structure sub-system determines that 30% of the data records are for men and 70% correspond to women. Note that this data will preferably already be available in the range data table under entries for number of occurrences of each state of each field. Note also that variable values may be defined as intervals, not only as individual values; thus, solely for the sake of simplicity of explanation, in the illustrated example, frequency data (field F10) is given as one of three intervals: 0–5, 6–10, and more than ten purchases per time period, both for males and for females. For each frequency and for each sex, the data is further branched into age intervals: under 20, 21–35, 36–55, and over 55. (The decision tree will normally continue to branch further in order to include the possibilities for the other fields, but these have been deleted in order to simplify the discussion, with no loss of generality.) The total average spending for each branch is indicated at the tip of the lowermost branch (the independent variable). For example, the total average spending of the group of 36–55 year-old men who purchase 6–10 times per time period is $704.

Given the illustrated tree's ordering of branches, one can see that the highest level of average total spending is for 36–55 year-old women who purchase 6–10 times per period ($2630). By summing "upward" all branches at each level, the system can determine the total average purchases of all men/women whose frequency is 6–10, then for all men/women and then by traversing the tree "downward" the system can pick the path (order of variables) that gives the greatest total average spending, the next greatest, and so on. Note that the decision tree structure is not limited to numerically ordered fields.

In another, straightforward structural description of the data base the system compiles and inspects the distribution of distinct values (or number of values in a plurality of distinct intervals). This may be done either independently or in conjunction with the construction of, for example, a decision tree.

Yet another way to determine the structure of the data base is by using a neural network. The theory and construction of neural networks is well documented and understood and is therefore not discussed in detail here. Of note, however, is that neural networks must in general be "trained" to stabilize on known data sets before they can be used on "actual" data sets. In the context of this invention, the use of a neural network will thus normally depend on some beforehand knowledge of at least the type of data in the data base, so that a suitable set of training data can be compiled and used to train the network. Here, "suitable" means of the same general type, distribution, and with the same general data relationships as those actually presented to the processing system in later use. In many cases this will not be possible; in others, however, it often is, for example, where the data base is numerical and dependent on an underlying set of substantially constant rules or natural laws such as meteorological data.

Assuming some other method is first applied to determine membership functions for the different variables (data fields), fuzzy logic techniques may also be used to measure the strength of relationships among pairs or groups of variables.

Other structure-determining methods include predictive rule-based techniques, which are described, along with still other methods, in *Data warehousing: strategies, technologies and techniques,* Ron Mattison, McGraw Hill, 1996.

Each different method for determining the structure of the data corresponds to a particular measure of what is meant by the "closeness" or "strength" of the relationship between two or more data fields. In many cases, only one of the different structure-determining methods in the sub-system 144 will be suitable for the detected data types. For example, statistical correlation may be the most suitable method if all of the data fields correspond to numerical data, whereas decision trees will normally be more efficient for ordering fields of strings or Boolean data. "Suitable" and "efficient" may be defined and calculated in any predetermined, known sense to determine a validity value indicating the validity of the corresponding measure. Furthermore, in many cases the methods themselves will reveal their own unsuitability. For example, if almost all data field pairs have statistical correlation near zero, then a different method, such as a decision tree, is almost certainly indicated.

Common to all the structure-determining techniques applied by the structure sub-system is that the sub-system determines a measure of relevance for each data field. In some cases, the relevance measure for a given field may be wholly independent of other fields. For example, one straightforward measure of relevance might be a count of how many fields have a certain value, or how many distinct values the field holds. This might be very relevant, for example, in evaluating the sales of some particular product, regardless of other sales.

In other cases, the measure of relevance may be a measure of dependence of some set of dependent, secondary variables (fields) on some base, independent variable (field) selected either automatically or by user input. One method for automatic selection would be to use as the independent field the same field ultimately selected by the user during a previous evaluation of the same or a similar data base or through user input. Another automatic method would be for the system to be connected to an existing expert system, which then selects the independent field. Yet another automatic method would be for the system to determine all possible pairs (or some predetermined or heuristically determined number of pairs) of fields, then evaluate the relevance measure for each pair, and then order all the results for user evaluation and selection. Statistical correlation (alone, or in conjunction with a linear regression or other curve-fitting routine) is one example of a measure of relevance that is based on a measure of dependence.

Once the system has calculated the relevance measure for each of the fields, then it preferably presents the results to the user by displaying the corresponding field names (or some other identifier) in order (for example, decreasing) of their relevance measures. Where the relevance measure involves dependence of secondary fields on a chosen base field, then the system preferably displays an indication of which field is the base field and in what order the other fields depend on it. The dependent variables are, for example, ordered in terms of decreasing dependence so that the user is given guidance as to which relationships may be of greatest interest. (As is described below, the user can change the order of presentation and the plotted, relationship-visualizing display.)

At any time after the system has determined the type and ranges of the various data fields, the system proceeds with query device selection. Consider once again FIG. 2. In the preferred embodiment of the invention, the initially presented query device will depend primarily on how many different possible values a data field can assume. The thresholds for selecting the different query devices will be predetermined and pre-programmed into the system, but can be changed under user control after initial presentation (for example, by activating a icon of the desired query device and then "dragging" it to the currently displayed query device, by activating and selecting from a pull-down menu adjacent to the currently displayed device, or by using any other known technique for changing portions of a graphical user interface). For example, if the data type if Boolean, a toggle may be predetermined to be the initial query device selected. For string and/or numerical data with fewer than, for example, seven different values, a checkbox or pull-down menu may be the default query device. For fields (variables) with more than some predetermined threshold number of different values, however, the default query device may be a single or range slider, depending on the data type.

More detailed discussion of query device selection is disclosed in the inventors' article (also mentioned above) "Exploring Terra Incognita in the Design Space of Query Devices," C. Ahlberg & S Truvé, Dept. of Computer Science and SSKKII, Chalmers University of Technology, Göteborg, Sweden, which is attached as appendix A, which also discusses the scaling of sliders as a function of their range. For example, the lower limit of the data values may be placed at the left end of the slider scale, the upper limit at the right end, the different gradations or value marks (AB . . . CD . . . E . . . K . . . L . . . MNPR . . . S . . . W) can be displayed adjacent to the slider, and centered on the previously calculated median or average value.

The chosen query devices for the different data field variables are then preferably displayed on the display in the order of dependence on the chosen independent variable. The ordering used is, preferably, at least initially, as determined by the structure-detecting method that calculated the most significant dependence relationship in any pre-defined sense, that is, has the greatest validity value. For example, an indication of the name of the independent variable (that is, its field name) may be displayed in some prominent position on the display screen, and the other query devices are then preferably positioned top-to-bottom, left-to-right, or in some other intuitive way so as to indicate decreasing measured dependence on the independent variable.

Once the query devices are sorted and displayed, the system preferably also displays an initial plot (for example, X–Y, pie chart, bar graph, etc.) of the relationship. The initial type of plot, its scaling, color scheme, marker type, size, and other features—in short, the view selection—are preferably selected in any conventional manner.

Figure 5:
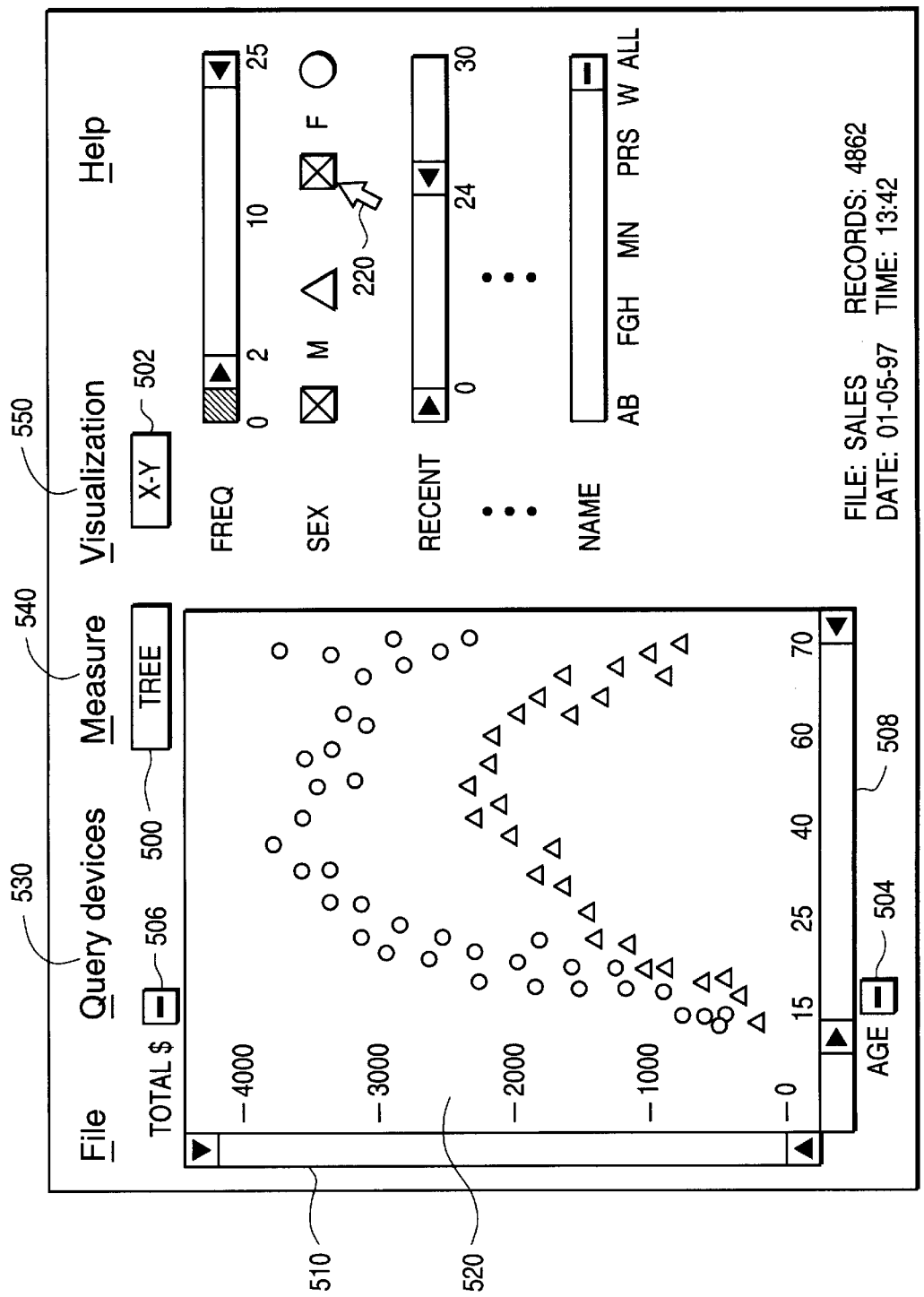
FIG. 5 illustrates a display of the results of a data base analysis using the invention.

FIG. 5 illustrates a simplified display screen corresponding to one possible set of data processed by the invention using the earlier example of a data base of sales statistics. In the example, the system has determined that the strongest relationship, given the independent variable age, is with purchase frequency, followed by sex, then recency, and so on, which is indicated to the used by displaying the corresponding query devices vertically in descending order. In the example, rangesliders were indicated and automatically selected for the fields "Frequency" and "Recency", whereas toggles were chosen for each of "Male" and "Female," since they can be plotted non-exclusively using different data markers, for example "Δ" and "○". The structure detection method (measure) with the best validity value is displayed in display region 500 as the decision tree ("TREE"). The default plot type is shown in region 502 as an X–Y plot. By activating, for example, conventional pull-down menus such as 530, 540 and 550, the user may direct the system to change the query device for any given field, the measure to be used to determine the order of dependency of the dependent variables (data fields), for the plotting the plot type or color scheme, etc.

Using a pull-down menu, the user had selected "AGE" as the independent variable, and, using a different pull-down menu 506, indicated to the system that TOTAL PURCHASES should be plotted against AGE. Rangesliders 508, 510 are preferably displayed on the respective x- and y-axes to allow the user to adjust (by moving the range markers with the cursor 220) the displayed ranges. In the illustrated example, the system plot only the data for which the frequency lies in the range 2–25, the recency lies in the range 0–24, since the user has moved the range markers of the respective range sliders accordingly.

Using known techniques, the system continually senses the state of all toggles, range and alphasliders, etc. and whenever a change is detected, it re-plots the selected relationship to include only the desired data characteristics. For example, if the user were to "click" on the toggle for "Male" ("M"), so that it is de-selected, then the system would remove the "Δ-marked" data points on the plot 520. As the user changes the settings of other query devices, the system updates the display accordingly to include only the field data that falls within the indicated ranges. This allows the user to view and change the data base presentation interactively, so that there is no break in concentration and exploration of the data base for time-consuming re-submission of conventional queries.

Administrative information such as data set file name, the number of records, and the date and time may also be included on the display screen as desired and as space permits.

We claim:

1. A method for processing and visualizing data from a data base, in which the data base contains a plurality of records, each record includes a plurality of data fields, each field contains field data, has a field name and one of a plurality of data types, the method comprising the following steps:

accessing the data base and reading the records;

automatically determining a range of the field data in each of the data fields;

for each data field, selecting and calculating a relevance measure, the relevance measure being a predetermined, data type-dependent function indicating, for interdependent data fields, a predefined measure of relational closeness to at least one other of the data fields and, for non-interdependent data fields, a predefined measure of a data type-dependent characteristic solely of the field data in each non-interdependent data field;

automatically detecting a relational structure between the fields by calculating the respective relevance measure for each of the fields;

for each of the data fields, automatically selecting an initial, adjustable, graphical query device as a predetermined function of and adapted to the type and range of the corresponding field data;

and displaying for viewing by a user graphical representations of the relational structures of selected ones of the fields and their corresponding initial query devices in an order determined as a predetermined function of their respective relevance measures;

sensing adjustment by the user of any of the displayed, adjustable, graphical query devices; and updating the graphical representations of the relational structures corresponding to the sensed adjustments of any of the query devices, thereby enabling interactive visualization of the relational structures of the data fields.

2. A method as described in claim 1, further including the following steps:

automatically detecting the data type of each field;

automatically detecting a data range for each field by evaluating the corresponding field data over a plurality of the data records;

for each field, automatically selecting one of a predetermined set of display query devices as a predetermined function of the corresponding data type and data range;

for each field, displaying to the user the corresponding display query device with displayed range markings corresponding to the data range of the field, the displayed query device being user-adjustable over the displayed range markings;

sensing user adjustment of the displayed query device;

selecting a primary and at least one secondary field; and displaying the secondary field's field data as the function of the primary field's field data only for the portion of the secondary field's field data that falls within the data range of the secondary field corresponding to the user adjustment of the corresponding query device.

3. A method as defined in claim 1, further including the following steps:

designating one of the fields as a primary field and the remaining fields as secondary fields;

automatically calculating the relevance measure for each of the secondary fields relative to the primary field;

ordering the secondary fields according to their respective relevance measures;

displaying the secondary field names for the user in order of the relevance measures of their corresponding fields;

displaying initially at least the secondary field having the highest-order degree of relevance as the function of the field's field data; and sensing user selection of one of the displayed field names and displaying the secondary field's field data corresponding to the selected field name as the function of the base data field's field data.

4. A method as defined in claim 3, further including the following steps:

selecting a plurality of relevance measures;

automatically detecting a plurality of relational structures between the secondary fields and the primary field for each of the plurality of relevance measures by calculating each relevance measure for each of the secondary fields relative to the primary field;

automatically designating as a primary relevance measure the one of the plurality of relevance measures having a greatest validity value; and displaying an indication of the primary relational structure for the user.

5. A method as defined in claim 4, further including the following steps:

ordering the relevance measures according to respective degrees of structural value;

displaying for the user indications of the plurality of relevance measures in order of the corresponding validity values; and sensing user selection of one of the displayed indications and designating as the primary relevance measure the relevance measure corresponding to the selected indication;

ordering the secondary fields according to respective degrees of relevance for the primary relevance measure; and displaying the field names for the user in order of the degrees of relevance of their corresponding fields using the primary relevance measure.

6. A method as described in claim 3, further including the following steps:

automatically detecting the data type of each field;

automatically detecting a data range for each field by evaluating the corresponding field data over a plurality of the data records;

for each field, automatically selecting one of a predetermined set of display query devices as a predetermined function of the corresponding data type and data range;

for each field, displaying to the user the corresponding display query device with displayed range markings corresponding to the data range of the field, the displayed query device being user-adjustable over the displayed range markings;

sensing user adjustment of the displayed query device; and displaying the secondary field's field data corresponding to the selected field name as the function of the base data field only for the portion of the secondary field's field data that falls within the data range of the corresponding secondary field.

7. A method for processing and visualizing data from a data base, in which the data base contains a plurality of records, each record includes a plurality of a field, each field contains field data, has a field name and one of a plurality of data types, the method comprising the following steps:

accessing the data base and sequentially reading the records;

designating one of the fields as a primary field and the remaining fields as secondary fields;

selecting a plurality of relevance measures relating each secondary field, respectively, to the primary field;

automatically detecting a plurality of relational structures between the secondary fields and the primary field for each of the plurality of relevance measures by calculating each relevance measure for each of the secondary fields relative to the primary field;

automatically designating as a primary relevance measure the one of the plurality of relevance measures having a greatest validity value;

ordering the secondary fields according to respective degrees of relevance according to the primary relevance measure;

displaying the field names for viewing by the user in order of the degrees of relevance of their corresponding fields;

displaying initially a graphical representation of at least the secondary field having the highest-order degree of relevance as the function of the primary field's field data; and sensing user selection of one of the displayed field names and displaying for user viewing a graphical representation of the secondary field's field data corresponding to the selected field name as the function of the primary data field's field data.

8. A system for processing and visualizing data from a data base, the system comprising:

a relational data base storing a plurality of records, each record including a plurality of data fields, each field containing field data, having a field name and one of a plurality of data types;

a main processing system;

a user input device that is connected to the main processing system;

a display that is connected to the main processing system;

connection means for connecting the main processing system to the data base;

the main processing system comprising processing means:

for accessing the data base and reading the records;

for automatically determining a range of the field data in each of the data fields;

for each data field, for selecting and calculating a relevance measure, the relevance measure being a predetermined, data type-dependent function indicating, for interdependent data fields, a predefined measure of relational closeness to at least one other of the data fields and, for non-interdependent data fields, a predefined measure of a data type-dependent characteristic solely of the field data in each non-interdependent data field;

for automatically detecting a relational structure between the fields by calculating the respective relevance measure for each of the fields;

for each of the data fields, for automatically selecting an initial, adjustable, graphical query device as a predetermined function of and adapted to the type and range of the corresponding field data;

for displaying for viewing by a user graphical representations of the relational structures of selected ones of the fields and their corresponding initial query devices in an order determined as a predetermined function of their respective relevance measures;

for sensing adjustment by the user of any of the displayed, adjustable, graphical query devices; and for updating the graphical representations of the relational structures corresponding to the sensed adjustments of any of the query devices, thereby enabling interactive visualization of the relational structures of the data fields.

9. A system as described in claim 8, in which the main processing system comprises:

data type sub-processing means for automatically detecting the data type of each field;

range detection sub-processing means for automatically detecting a data range for each field by evaluating the corresponding field data over a plurality of the data records;

query device selection sub-processing means for automatically selecting, for each field, one of a predetermined set of display query devices as a predetermined function of the corresponding data type and data range;

interface selection sub-processing means for displaying to the user, for each field, the corresponding display query device with displayed range markings corresponding to the data range of the field, the displayed query device being user-adjustable by means of the input device over the displayed range markings;

the main processing system being further provided:

for sensing user adjustment of the displayed query device by means of the input device;

for selecting a primary and at least one secondary field; and for displaying the secondary field's field data as the function of the primary field's field data only for the portion of the secondary field's field data that falls within the data range of the secondary field corresponding to the user adjustment of the corresponding query device.

\* \* \* \* \*